United States Patent [19]

Bechu et al.

[11] Patent Number: 4,858,535
[45] Date of Patent: Aug. 22, 1989

[54] INTERCIRCULATION TUNNEL BETWEEN VEHICLES

[75] Inventors: Jean-Pierre Bechu, Courbevoie; Jacques J. Champleboux, Clermont-Ferrand, both of France

[73] Assignee: Caoutchouc Manufacture et Plastiques, Bezons, France

[21] Appl. No.: 874,717

[22] Filed: Jun. 16, 1986

[30] Foreign Application Priority Data

Jun. 14, 1985 [FR] France ................. 85 09011

[51] Int. Cl.⁴ .................. B60D 5/00; B61D 17/22
[52] U.S. Cl. .................................................. 105/15
[58] Field of Search .................. 105/3, 8.1, 15; 428/316.6, 319.7; 285/225, 226; 280/403, 424

[56] References Cited

U.S. PATENT DOCUMENTS

| | | | |
|---|---|---|---|
| 2,126,837 | 8/1938 | Stewart et al. | 105/15 |
| 2,225,951 | 12/1948 | Christianson | 105/15 |
| 2,354,045 | 7/1944 | Nystrom et al. | 105/15 |
| 2,578,140 | 12/1951 | Krupp et al. | 105/15 |
| 3,410,226 | 11/1968 | Krupp et al. | 105/10 |
| 4,543,289 | 9/1985 | Park | 428/319.7 X |
| 4,570,964 | 2/1986 | Tatey et al. | 280/403 |
| 4,599,947 | 7/1986 | Keefer | 105/15 |

FOREIGN PATENT DOCUMENTS 2328141 5/1977 France.
2333657 7/1977 France.
1361064 7/1974 United Kingdom.

Primary Examiner—Robert B. Reeves
Assistant Examiner—Frank H. Williams, Jr.
Attorney, Agent, or Firm—Antonelli, Terry & Wands

[57] ABSTRACT

An intercirculation tunnel between successive railroad cars or highway vehicles for ensuring protection against bad weather and atmospheric agents as well as noise and heat insulation as a unitized structure with oval constant cross section. The structure has a self-supporting wall that is elastically deformable throughout without mechanical devices, and that is composed of a multilayer composite of compact elastomers including an outer layer and an inner layer which can also contain reinforcements and an intermediate layer of a cellular polymer material.

10 Claims, 4 Drawing Sheets

U.S. Patent    Aug. 22, 1989    Sheet 1 of 4    4,858,535
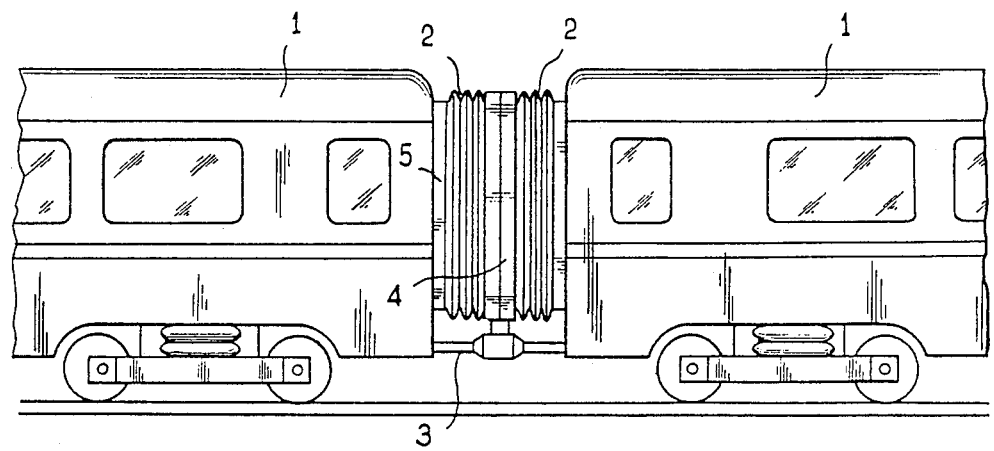
FIG_1a
(PRIOR ART)
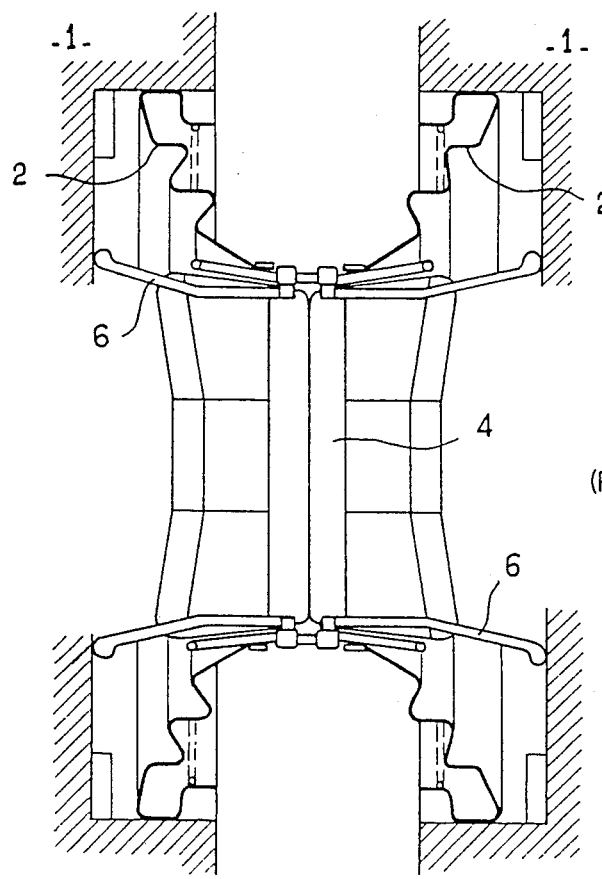
FIG_1b
(PRIOR ART)

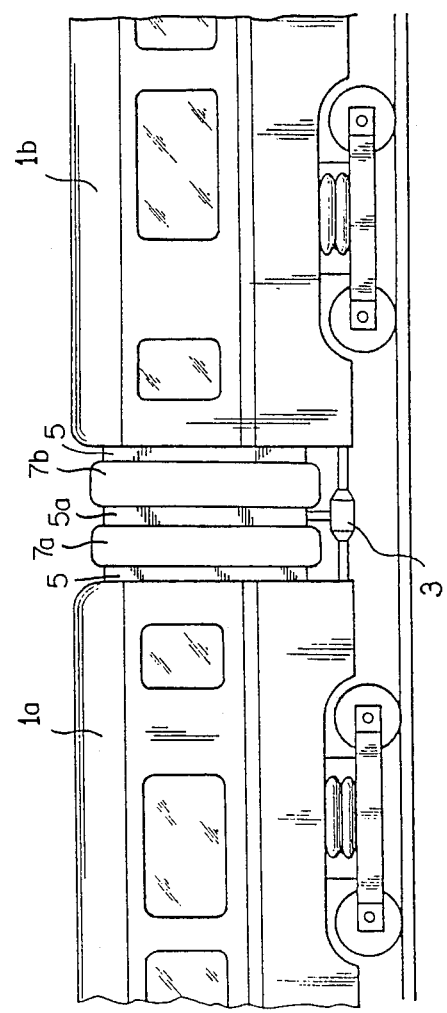
FIG_5

INTERCIRCULATION TUNNEL BETWEEN VEHICLES

The invention relates to railway vehicles for passengers or railcars, rapid-transit cars, light-rail vehicles, or articulated buses wherein passage from one vehicle to the other is made possible for the public via deformable elements usually called bellows.

Various means of intercirculation exist permitting circulation either of authorized officials when these passageways are not airtight and fully secure, or of the public when the safety conditions are sufficient.

One family of these devices employs a rigid structure supported by the chassis of two successive cars. The other family is composed of accordion-shaped bellows made from textile materials coated with rubber or plastic.

French Patent 7631202 by the company Taurus Gumipari Vallalat and French Patent 7633576 by Hubner Gummi and Kunststoffe propose an improvement of the bellows principle beginning from composite textile-elastomer walls, in the form of plates, joining of whose edges, alternately inside and outside, confers a self-supporting character on the system.

A device which combines the principle of the rigid passageway with the deformability of flexible walls is described in GB Patent 2009691 of S.I.G. Such a device ensures the tightness function by a deformable rolling joint and the soundproofing function by telescopic sliding of rigid walls. It has no self-supporting character without supplementary mechanical means.

Patent GB2122956 by Taurus Gummipari Vallalat describes a means of communicating between two cars wihch is self-supporting and unitized. It uses a homogeneous cellular material of heavy polyurethane (density approximately 1 g/cm$^3$) with great hardness (70 to 100). Since this material has insufficient mechanical characteristics, in particular dynamic strength, it is necessary to confer an accordion shape on the device to allow it to deform as necessary under service stresses. Production of such an accordion shape requires a complicated and hence expensive mold, and makes unmolding operations difficult if the part is not to be damaged. By nature, the material used is resistant neither to fire nor to acts of vandalism and its homogeneous structure does not guarantee good noise insulation.

GB Patent 1361064 by the British Railways Board proposes a device which also uses cellular polyurethane, a homogeneous material unfavorable to noise insulation, which requrires application of a skin (by spraying for example) to ensure protection against weather and fire. This device is not self-supporting since it requires supporting arms. It is also not unitized and, for assembly, requires modification of one end of the car to which it is fitted, which complicates installation operations.

The intercommunication system of U.S. Pat. No. 3410226 by B. F. Goodrich is also composed of a cellular material. It is neither self-supporting nor unitized and cannot function under normal service conditions because it is under compressive sterss when resting. Hence it can only be deformed by some mechanical means. Moreover, due to the number of elements inserted therein such as attachments, squares, etc. and the presence of voids, it is complicated and hence expensive to manufacture.

U.S. Pat. No. 2126837 by B. F. Goodrich also describes a multilayer structure for producing a wall and not a continuous tunnel. This wall is composed of textile-reinforced compact rubber, a material unfavorable for correct noise insulation. It is manufactured flat and is therefore not ring-shaped. It also does not have self-supporting characteristics.

British Belting & Asbestos presents in GB Pat. No. 666383, materials designed for lining of zones connecting an intercirculation tunnel to the walls of cars, said lining being manufacturable in particular from asbestos. Because of current legislation, such a lining could no longer be used today.

German Patent 1780097 by the Institut fuer Schienenfahrzeuge proposes a short link between two cars made of two devices one of which slides over the other, component shapes surrounding the passage section and the outside surface of the end of the car. The system functions as a damper in the event of impacts. It is made of homogeneous cellular polyurethane offering no protection against fire or vandalism and far less effective than a composite structure with multiple alternating layers of an elastic material and a cellular material. Cellular polyurethane, because it has the compressive strength characteristics indicated, probably has a high density such as not to permit the desired flexibility when going around curves and return curves.

Analysis of the prior art shows that a single easily built device which is simultaneously deformable and self-supporting and perfectly provides the functions of tightness and noise insulation of the same level as that provided by the rigid walls of the cars is not known.

The tunnel device according to the invention is composed of a unitized element with a cylindrical shape and generally ovoid cross section, composed of a composite wall, deformable throughout without mechanical devices, and self-supporting, having an outside layer of compact elastomer, one or more layers of a highly deformable cellular but high-modulus material, and an inner elastomer layer possibly reinforced with metal or textile cords.

The outer layer provides the functions of tightness and protection against bad weather and atmospheric agents. It is advantageous to make it of a material based on elastomer such as, as a nonlimitative example, polychloroprene, possibly having additives or ingredients to improve ability to withstand fire and splashed oil and grease.

At least one layer of cellular material, with a density less than 200 kg/m$^3$ and a modulus greater than or equal to 0.2 MPa provides both noise and heat insulation - which is important in a link between air-conditioned cars - as well as, by a known beam effect, maintenance of the spacing of the wall elements, which confers a self-supporting character on the whole.

The inner layer, possibly reinforced with sheets of high-modulus textiles or metal cords, ensures protection against vandalism attempts by cutting or burning and against bumps from luggage. This layer can be supplemented by adding a floor which follows the deformation of the whole and increases acoustic insulation from the wheels and trucks.

The characteristics and variants of the invention will be better understood by reading the description hereinbelow with reference to the drawings wherein:

FIGS. 1a and 1b show, respectively, a side view and a sectional view of one embodiment a device of the prior art, FIG. 2 represents a cross section of the intercirculation tunnel according to the invention, FIGS. 3a–3c illustrate different embodiments of the tunnel according to the invention, FIG. 4 is a lengthwise section of the wall showing the connection of said wall to a car by a connecting flange, and FIG. 5 shows an embodiment including two intercirculation tunnel sections connected by an intermediate flange.

FIG. 1a shows the ends of two passenger cars (1) connected by a coupling (3). The usual intercirculation device is composed of two bellows (2) connected by a median assembly flange (4) and fastened to the cars (1) by flanges (5).

FIG. 1b is a section along a horizontal plane of one of the known devices where the tightness and acoustic insulation functions are separate, the first being provided by two bellows (2) connected by a median assembly flange (4) which forms the beginning of a rigid tunnel. The continuity of the acoustic insulation is ensured by the sliding of rigid articulated walls (6) attached to cars (1).

Figure 2:
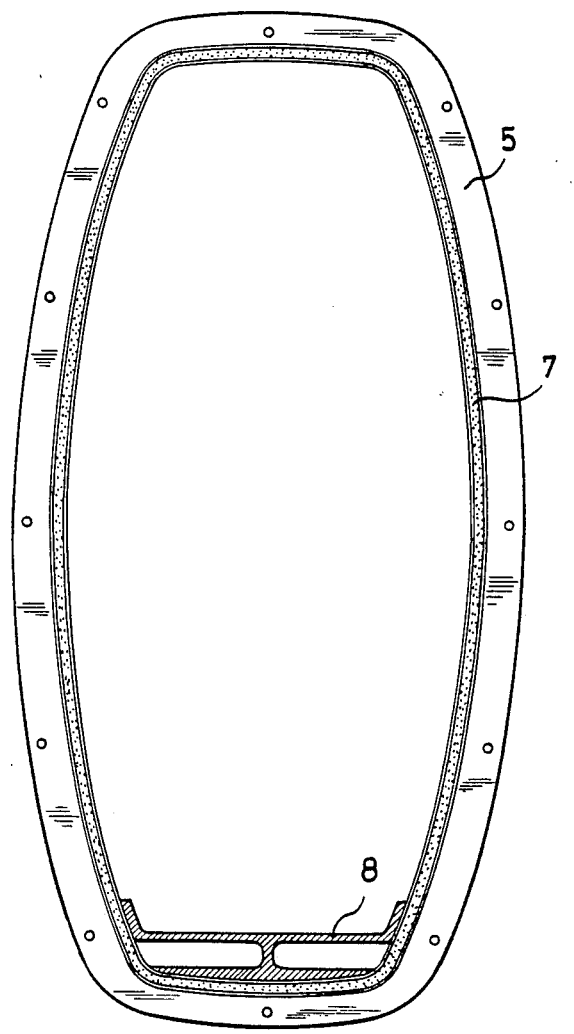

FIG. 2, a section orthogonal to a car axis, shows the ovoid tunnel section according to the invention, which is attached to the end of each passenger car by a flange (5), said wall (7) being composed of an assembly of compact, cellular polymer materials. A deformable floor (8) is added to ensure continuity of level with the cars and hence improve acoustic insulation facing the wheels and trucks.

Figure 3A:
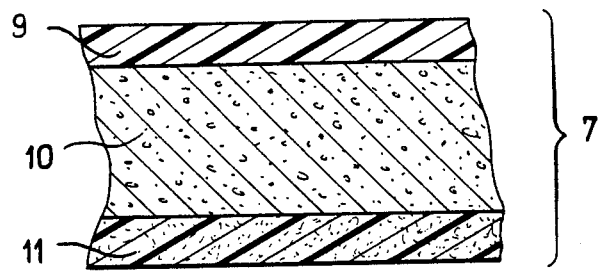
Figure 3B:
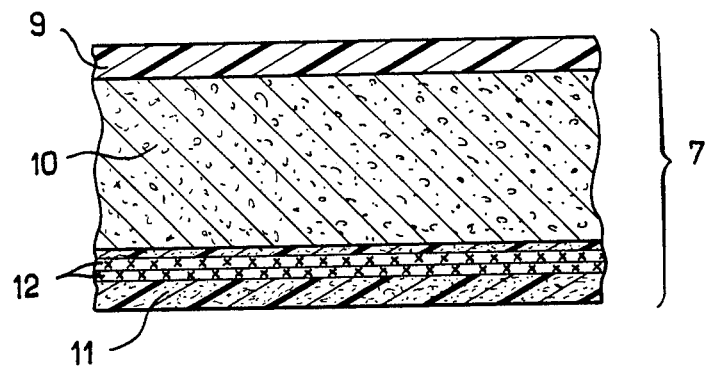
Figure 3C:
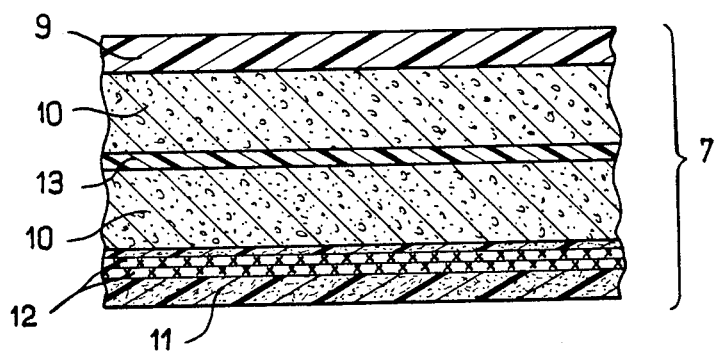

FIGS. 3a, 3b and 3c illustrate various constructions of the wall (7) of the intercirculation tunnel.

FIG. 3a, wall (7) is composed of an outer layer (9) made of a compact elastomer-based mixture, preferably polychloroprene-based, to ensure fire protection, of an intermediate layer (10) made of a cellular material with a specific gravity less than 200 kg/m$^3$, preferably between 70 and 100 kg/m$^3$ and with a modulus at least equal to 0.2 MPa, preferably made by expansion of a mixture based on cross-linked ethylene/propylene terpolymer, and finally an inner layer (11) made of a compact elastomeric material the formulation of which can be designed to ensure good fire resistance.

FIGS. 3a 3b differs from the preceding figure only by the integration, within inner layer (11), of one or more layers (12) of textile or metal reinforcing materials which also ensure protection against vandalism.

FIG. 3c represents a wall (7) made of 5 layers alternating from the outside to the inside, layers (9) and (10) being identical to those described in FIGS. 3a and 3b, then a layer (13) made of a compact elastomer, interposed between two layers (10) in order to multiply the number of interfaces between materials with different characteristics such as to increase sound insulation by reducing the opportunity for sound transmission. Then come a second cellular layer (10) and inner layer (11), which layer (11) can include reinforcing elements (12), layers (10) and (12) being identical to those described in FIG. 3b.

Figure 4:
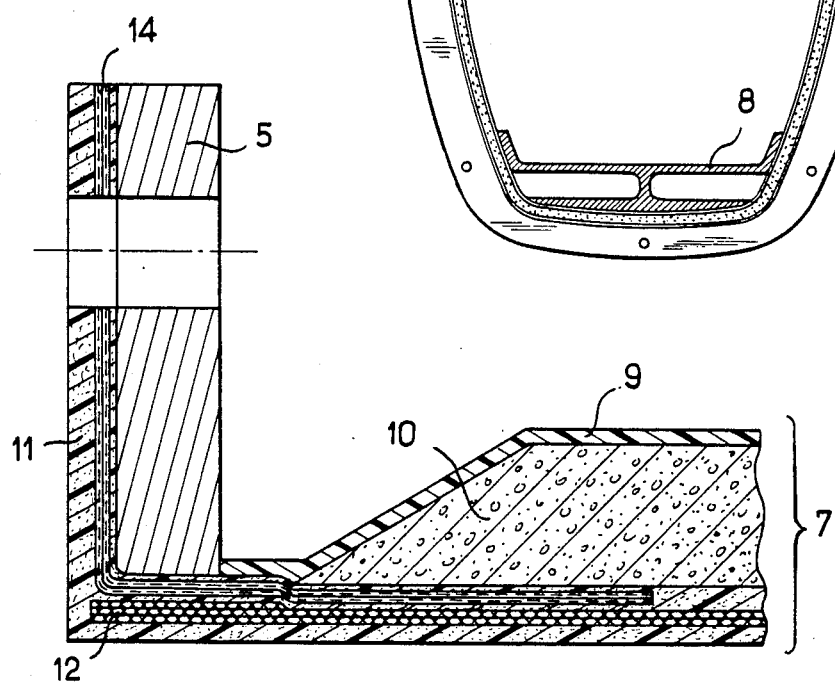

FIG. 4 is a longitudinal section of wall (7). It shows one of the possible ways of connecting the wall elements to rigid flange (5), made of metal or of rigid composites, which permits the intercirculation tunnel to be connected to the ends of the cars. Here, there is provided an outer layer (9) made of a compact elastomer-based mixture, the layer made of cellular material (10), and an inner layer (11) which extends under flange (5) in contact with the end of car (1).

In this figure, inner layer (11) has a textile or metal reinforcement (12). A sheet of textile or metal cords (14), known as the connecting sheet, provides a progressive link, by covering reinforcing layer (12), between wall (7) and flange (5) which provides the connection to the end of the car.

FIG. 5 shows an embodiment used to increase the flexibility of the device. The assembly is composed of two self-supporting intercirculation tunnel sections (7a) and (7b), each being interconnected at one end to a railway car (1a) and (1b) and being connected together at their facing ends by use of an intermediate flange 5a.

In conclusion, the invention is characterized by a unitized structure of an intercirculation tunnel between cars, which permits simple and direct assembly on the facing ends of the cars, by means of connecting flanges, without the use of mechanical devices or accordion assemblies.

The intercirculation tunnel has simultaneously the characteristics required to provide the functions of protection against, fire, weather and atmospheric agents, luggage bumps, and vandalism and the high-level heat and acoustic insulation functions required for modern transportation equipment, while being capable of withstanding the necessary loads by itself, with moderate weight.

Since it is a body of revolution, the intercirculation tunnel can easily be made by placing, on a mandrel of appropriate shape, mounted on a assembly jig, various elements forming the wall integrating the connecting flanges. Assembly follows by strapping or any other appropriate retaining means and vulcanization, generally in an autoclave.

The floor is molede and is laid or glued when the tunnel is finished to allow movement of passengers between vehicles in railcars, rapid-transit cars, light-rail vehicles or articulated buses.

For certain particular applications, it is possible to assemble, by means of an intermediate flange, two or more intercirculation tunnels as described above.

The individual skilled in the art can, of course, make various modifications to the device described above and to its applications illustrated as nonlimitative examples without thereby departing from the scope of the invention.

We claim:

1. An intercirculation tunnel between successive railroad cars or highway vehicles providing protection against bad weather and atmospheric agents as well as noise and heat insulation which comprises a unitized structure having a substantially oval cross section and formed of a self-supporting composite multi-layer wall which is elastically deformable; said wall comprising an outer layer made of a compact elastic polymer material for providing said protection against bad weather and atmospheric agents, an intermediate layer made of elastic cellular material for providing noise and heat insulation coextensive with the outer wall and an inner layer made of elastic polymer material covering said intermediate layer; said intermediate layer being intimately linked to adjacent layers, ensuring noise insulation and essentially constant spacing of layers throughout the extent of said layers and said inner layer, made of a compact elastomer completing the noise insulation and protection of pasengers within said tunnel.

2. Intercirculation tunnel according to claim 1, which further comprises at least one additional intermediate layer comprised of compact elastomer, which is interposed between two layers of cellular material to increase the number of interfaces between different materials to at least four thereby to enhance noise insulation.

3. Intercirculation tunnel according to claim 1 or claim 2, wherein the cellular material of the intermediate layer has a density less than or equal to 200 kg/m$^3$ and a modulus (under 50% compression) of at least 0.1 MPa.

4. Intercirculation tunnel according to claim 1, wherein the inner layer has a metal or textile-based high-modulus reinforcing material to provide increased protection against vandalism.

5. Intercirculation tunnel according to claim 4 wherein the reinforcing material of the inner layer is aramide.

6. Intercirculation tunnel according to claim 1, wherein the elastomer mixtures comprising the inner layer and the outer layer are based on polychloroprene rubber which provides a function of fireproofing.

7. Intercirculation tunnel according to claim 1, wherein connections to ends of railroad cars are provided, in a rigid manner, by flanges made of a rigid composite material or metal along which the inner layer is attached, there being reinforcement cords in the inner layer which overlay a surface of a flange.

8. Intercirculation tunnel between successive railroad cars or highway vehicles providing protection against bad weather and atmospheric agents as well as noise and heat insulation which comprises a unitized structure having a substantially oval cross section and formed of a self-supporting composite multi-layer wall which is elastically deformable; said wall comprising an outer layer made of a compact elastic polymer material for providing said protection against bad weather and atmospheric agents, an intermediate layer made of elastic cellular material for providing noise and heat insulation coextensive with the outer wall, an inner layer made of elastic polymer material covering said intermediate layer, a deformable floor, made of compact elastomer, said floor being mounted inside the unitized structure and supported by the composite multi-layer wall to provide continuity of walking levels between cars and to increase noise insulation in the direction of wheels and trucks.

9. Device for intercirculation between railroad cars or highway vehicles, characterized by being formed of an assembly of one or more intermediate flanges and at least two self-supporting tunnels according to claim 1.

10. An intercirculation tunnel having opposite ends attached to adjacent ends of two vehicles in a manner to allow passenger movement between said vehicles, said tunnel comprising:

a unitized multiple layer wall structure having an oval cross-section of substantially uniform size throughout the tunnel length, said structure being self-supporting and elastically deformable without use of mechanical devices, said cross-section having an interior height and width dimension substantially uniform throughout its length and sufficiently large to permit passenger movement between the vehicles, said structure having:

an exterior layer made of a compact elastic polymer material for providing protection against bad weather and atmospheric agents;

an inner layer of elastic polymer material having a smooth interior wall serving as an interior tunnel wall; and an intermediate layer intimately linked between said inner and outer layers to form said unitized wall structure, said intermediate layer being made of an elastic cellular material for providing substantially constant spacing between the inner and outer layers throughout the cross-section of the tunnel and along the entire tunnel length.

* * * * *